United States Patent
Henricksen

(10) Patent No.: US 7,018,126 B2
(45) Date of Patent: *Mar. 28, 2006

(54) MULTI-POST SHOCK ABSORBER CLAMP SYSTEM

(76) Inventor: Rob William Henricksen, 9202 Carnation Dr., Westminster, CA (US) 92806

( * ) Notice: Subject to any disclaimer, the term of this patent is extended or adjusted under 35 U.S.C. 154(b) by 0 days.

This patent is subject to a terminal disclaimer.

(21) Appl. No.: 10/811,783

(22) Filed: Mar. 29, 2004

(65) Prior Publication Data

US 2004/0247384 A1 Dec. 9, 2004

Related U.S. Application Data

(63) Continuation of application No. 10/010,501, filed on Dec. 5, 2001, now Pat. No. 6,712,541.

(60) Provisional application No. 60/251,456, filed on Dec. 5, 2000.

(51) Int. Cl.
*B25G 3/00* (2006.01)
*B62K 1/00* (2006.01)

(52) U.S. Cl. ............... 403/286; 403/338; 403/344; 280/276; 280/279; 280/280

(58) Field of Classification Search ........... 403/344, 403/338, 286; 280/276, 279, 280
See application file for complete search history.

(56) References Cited

U.S. PATENT DOCUMENTS

| 4,323,263 | A | * | 4/1982 | Cook et al. ............... 280/279 |
| 4,700,963 | A | * | 10/1987 | Burns et al. .............. 280/276 |
| 5,829,316 | A | * | 11/1998 | Krizman, Jr. |
| 6,104,099 | A | | 8/2000 | Mizuta et al. |
| 6,176,339 | B1 | * | 1/2001 | Reichardt ............... 280/280 |
| 6,176,503 | B1 | * | 1/2001 | George ................... 280/276 |
| 6,331,089 | B1 | | 12/2001 | Iteya |
| 6,712,541 | B1 | * | 3/2004 | Henricksen ............. 403/344 |
| 6,748,821 | B1 | * | 6/2004 | Smith |

* cited by examiner

*Primary Examiner*—Daniel P. Stodola
*Assistant Examiner*—Victor MacArthur
(74) *Attorney, Agent, or Firm*—Knobbe, Martens, Olson & Bear, LLP

(57) ABSTRACT

An intermediate device that clamps the front suspension of a two-wheeled and/or motorized vehicle as part of the steering system that attaches to the frame structure and provides a mounting area for the handlebar and controls. This multiple point mounting area comprises of Acrylonitrile/Butadiene polymer or Urethane dampeners positioned above and below the clamp plane. A shoulder bolt passing through from the lower side captures these dampeners against a step washer backed against the lower portion of the threaded handlebar clamp. This assembly provides a contained system of absorption of impact to the operators' forearms and hands while protecting against handlebar position relocation in the event of a collision, crash or aggressive rider input.

23 Claims, 3 Drawing Sheets

MULTI-POST SHOCK ABSORBER CLAMP SYSTEM

PRIORITY INFORMATION

This application is a continuation of U.S. patent application Ser. No. 10/010,501, filed Dec. 5, 2001, now U.S. Pat. No. 6,712,541, which claims priority from U.S. Provisional Patent Application No. 60/251,456, filed Dec. 5, 2000.

INCORPORATION BY REFERENCE

U.S. patent application Ser. No. 10/010,501, filed Dec. 5, 2001, and U.S. Provisional Patent Application No. 60/251,456, filed Dec. 5, 2000, are hereby incorporated by reference herein in their entireties and made a part of this specification.

BACKGROUND OF THE INVENTION

1. Field of the Invention

This invention concerns an improved system of steering a bicycle, motorcycle or other two-wheeled power vehicle or all terrain vehicle (including watercraft and snowmobiles) via a dampened, structurally supported multi-post mounting area for the controls.

2. Description of the Related Art

Off-road motorcycles are well known forms of transportation, generally used as a leisure or a competition activity. They are built for use on rough, challenging terrain and riding them usually requires maneuvering through turns and over jumps and obstacles. Thus, the responsiveness of the machine to the rider and the ability of the rider to stay physically able to maintain control are critical to avoiding injury and achieving competition success.

Currently "fork brackets" or "triple clamps" provide a one-dimensional function of holding upper suspension components in relation to a central steering stem and being a place to mount handlebars with rider controls. These parts are typically a one-piece aluminum die cast that has a solid lower handlebar mount or a single post lower bar mount that passes through said part incorporating a stiff durometer rubber dampener inset into the upper and lower plane.

Triple clamps with a solid lower bar mount (cast into it or bolted down to it) transmit every jolt and bump traversed by the vehicle through to the operator. They also provide no capability to handle or diffuse the harmonic of vibration. Both of these traits leave the operator fatigued before his time, potentially suffering from "chronic exertional compartment syndrome of the forearm", (commonly knows as "arm pump"), blistered hands, a tingling feeling in the arms and hands and an increasingly lessened ability to control his vehicle. With the current market containing many new models of handlebars that are larger in diameter and often double-walled or in some way rigid by design and the proliferation of models with stiffer frame designs the physical symptoms described above are somewhat magnified.

Clamps with a single rubber dampener at each bar mounting point suffer by design as every time the vehicle handlebars make contact with the ground or experiences a sharp jolt or harsh landing they twist in the area where the rubber encased bar mount bolt passes through the triple clamp. This leaves the operator with skewed handlebars and controls until he tears down the assembly and re-locates it or reefs on it to "encourage" it back into a straight setting. Dampening of the transmission of sharp jolts and shock, vibration etc is also extremely limited due to the stiff rubber compound necessary in an attempt to limit the previously mentioned symptom.

OBJECTS AND ADVANTAGES

The object of the present invention is to enable the operator to control his vehicle better for longer periods of time without the potential for handlebar misalignment or premature physical fatigue.

The multi-post design facilitates the use of softer durometer dampening compounds, as these dampeners are no longer relied upon to be part of the clamps structural support system. The structural design of the multi-post clamp, while providing a dampening action, gives forth a positive feel to the operator. There is no sensation of "vagueness" of the front wheel as it relates to the selection of a directional path via intended obstacles. Furthermore the design allows "tuneability" via adjustable captured dampener length and differing durometer dampeners located strategically according to conditions, model characteristics and operator preference.

SUMMARY OF THE INVENTION

The present invention is a predominately machined aluminum piece incorporating stainless steel and/or titanium hardware with a dampening agent arranged in a system of structure and encapsulation to eliminate the negative aspects of current/prior art outlined above.

DETAILED DESCRIPTION OF THE PREFERRED EMBODIMENT

Figure 1:
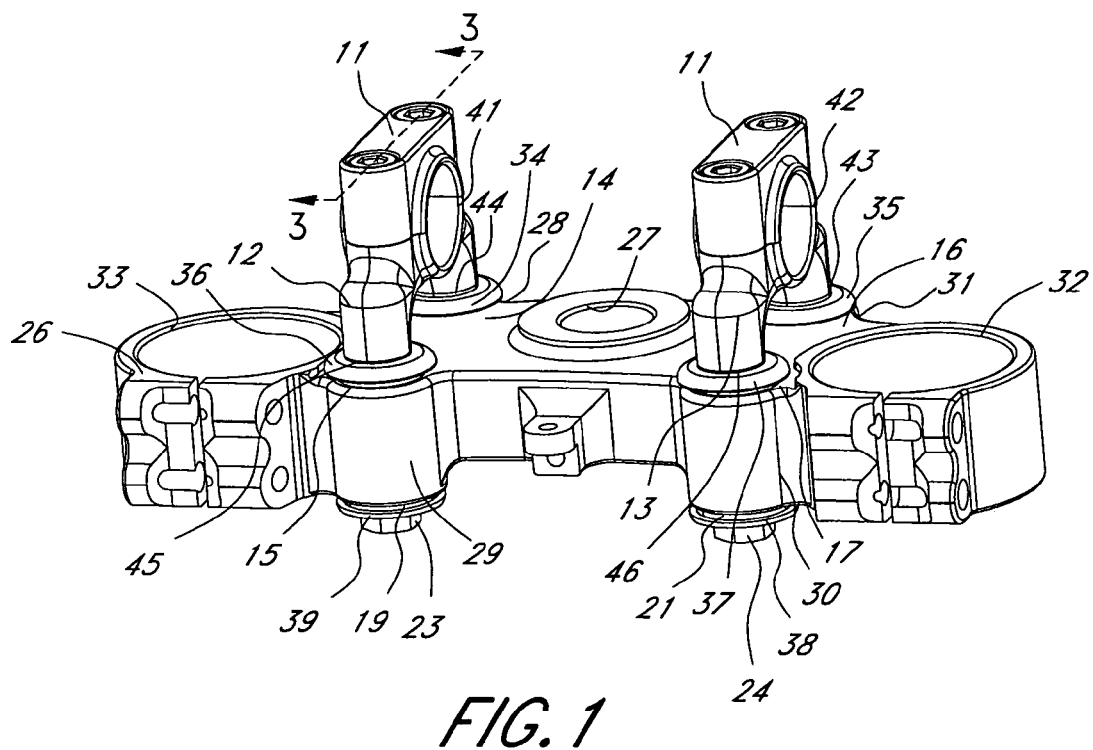
FIG. 1 shows a complete triple clamp assembly.
Figure 2:
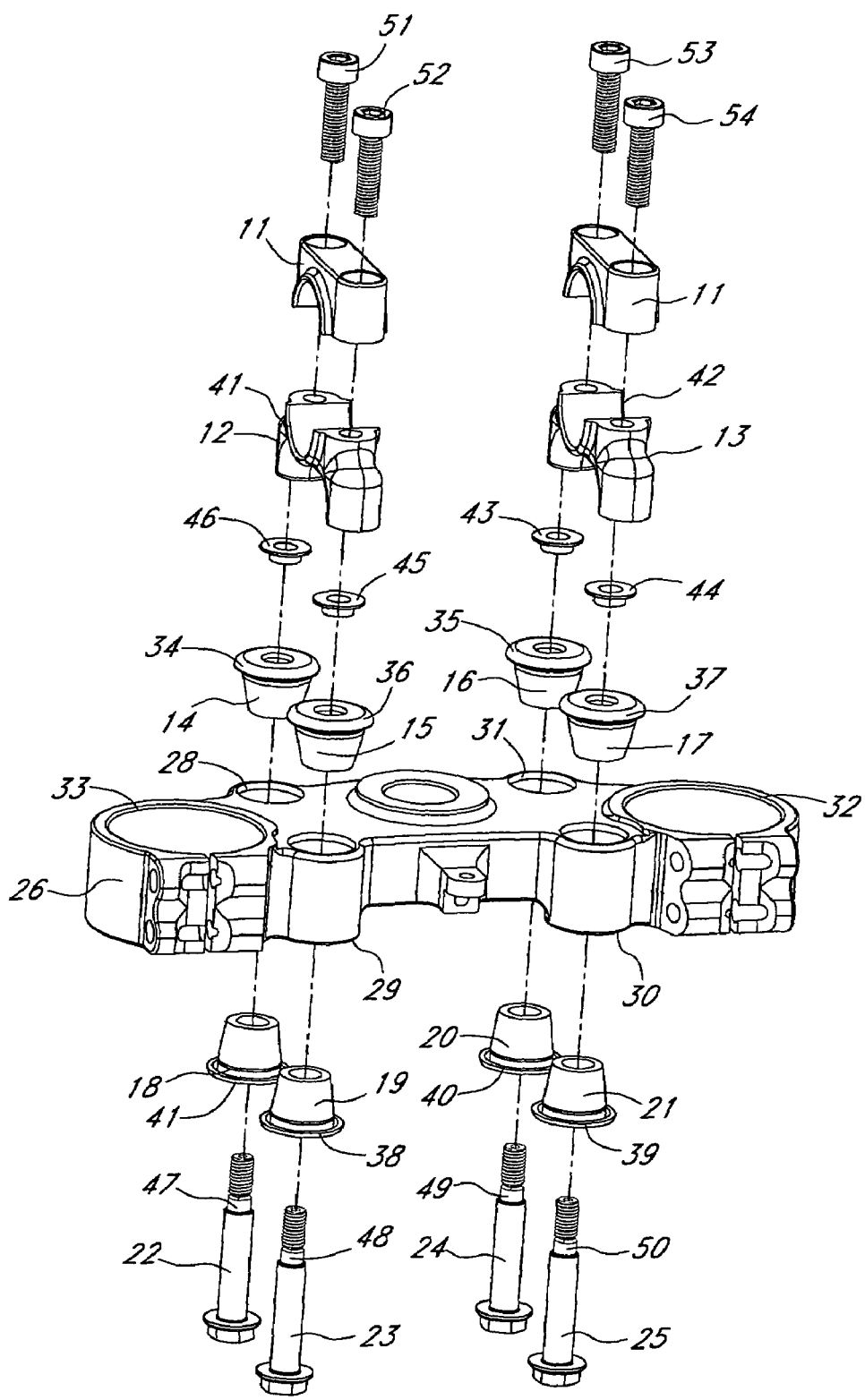
FIG. 2 shows an exploded view of FIG. 1.

Refer to FIG. 1 showing a complete triple clamp as it would be axially attached at its axis hole 27 to the vehicle stem (not shown). This same upper fork clamp 26 provides clamp support for a set of two telescopic forks (not shown) by brackets 32 and 33, a bracket clamp set (bar mounts/clamps) 11, 12 and 13 secured by threaded bolts 51, 52, 53, 54. The handlebar clamps 12 and 13 are attached to the upper fork clamp 26 via four bolts 22, 23, 24, 25 with specific shoulder dimensions 47, 48, 49, 50 that pass up and through four lower rubber or polymer cones (or blocks) 18, 19, 20, 21 that are bonded to aluminum cup washers 38, 39, 40, 41 encapsulated by lower machined tapered bores 28, 29, 30, 31 of upper fork clamp 26 and pass through upper cones 14, 15, 16, 17 bonded to aluminum cup washers 34, 35, 36, 37 which are encased by upper machined tapers 28, 29, 30, 31, through step washers 43, 44, 45, 46 and thread into handlebar clamps 12 and 13.

Figure 3:
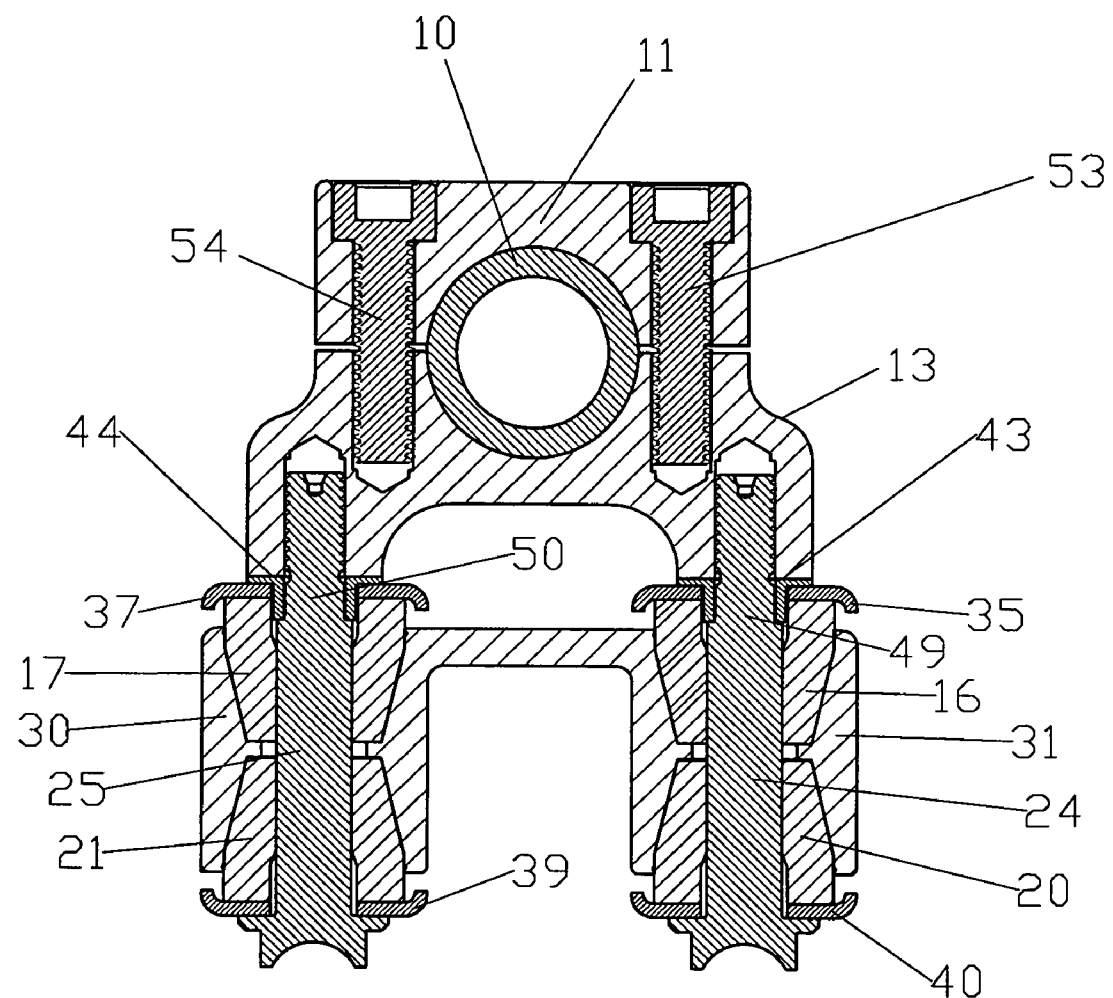
FIG. 3 is a cutaway view showing the assembled item and how the different elements of the product relate to each other.

The multi-post clamp is symmetrical from the centerline of pivotal mounting point 27. Said mount is achieved via installation over a steering stem that is attached to a lower fork tube clamp. Once the fork tubes are mounted, the upper and lower fork tube clamps pivot as a unit via the steering stem which locates and runs axially on upper and lower bearings within the head stem of the frame to form the steering action of the vehicle. The mounting point 27 is secured generally via either a nut threaded over the steering stem or a pinch-bolt assembly. FIG. 3 shows captured length of dampener assembly A with handlebar clamp 13 securing handlebars 10 incorporating but not limited to (not shown) a throttle device clutch arm, brake lever and engine kill switch to form a venue for vehicle control.

It will be noticed that other embodiments may contain additional structural support in the way of a one piece upper bar clamp mount 11 and a possible lower shoulder bolt 22, 23, 24, 25 brace or support bracket. Further embodiments may find as few as 3 lower bar clamp mounting points or as many as 6 points as alternative to the existing 4 point system. Progressively this could extend to a majority of dampening of a supported nature above the plane of the upper clamp 26 beneath the clamping area of the bar mounts 12, 13.

It will be noticed that cones 18, 19, 20, 21 are encapsulated by step washers 34, 35, 36, 37 and shouldered bolts 22, 23, 24, 25 when the clamp is assembled. The dimension, acquired dampener tension by captured length variation and component diameters may differ in other embodiments. The diameters and the pitch or distance apart of the fork tube clamping areas, the machined tapered boss and stem pivot locations and all other angles and lengths of regions may vary depending on the type of cycle or motorcycle or other vehicle for which they are intended.

As suggested above, the invention is not limited to the precise details of its current form. Many variations are possible especially when consideration is given to the variety of applications the concept of a dampened, supported structure as an aid to vehicle control may potentially be applied to.

What is claimed is:

1. A handlebar mount assembly, comprising:
   a triple clamp mountable to an associated vehicle for rotation about a steering axis;
   a first handlebar clamp assembly comprising a first lower handlebar clamp and a first upper handlebar clamp connectable to said first lower handlebar clamp, said first upper handlebar clamp and said first lower handlebar clamp cooperating to define a first aperture configured to receive a handlebar;
   a second handlebar clamp assembly comprising a second lower handlebar clamp and a second upper handlebar clamp connectable to said second lower handlebar clamp, said second upper handlebar clamp and said second lower handlebar clamp cooperating to define a second aperture configured to receive a handlebar, said first aperture and said second aperture defining a handlebar passage aligned along an axis of a handlebar;
   wherein each of said first lower handlebar clamp and said second lower handlebar clamp are removeably connectable to said triple clamp at first and second locations spaced from one another in a direction perpendicular to said handlebar axis;
   at least one dampener interposed between said triple clamp and said first lower handlebar clamp and said triple clamp and said second lower handlebar clamp.

2. The handlebar mount assembly of claim 1, wherein said at least one dampener comprises a first dampener and a second dampener associated with each of said first and second lower handlebar clamps, said first dampener positioned at said first location and said second dampener positioned at said second location.

3. The handlebar mount assembly of claim 1, wherein said at least one dampener abuts said first lower handlebar clamp and said second lower handlebar clamp.

4. The handlebar mount assembly of claim 1, wherein said first and second locations are located on a line extending perpendicular to said handlebar axis.

5. The handlebar mount assembly of claim 1, additionally comprising at least one fastener connecting each of said first and second lower handlebar clamps to said triple clamp.

6. The handlebar mount assembly of claim 5, wherein said at least one fastener comprises a bolt, wherein another dampener is positioned between a head portion of said bolt and a lower surface of said triple clamp.

7. The handlebar mount assembly of claim 5, wherein said at least one fastener comprises a bolt, said bolt extending through said dampener.

8. The handlebar mount assembly of claim 5, wherein said at least one fastener comprises a bolt, said bolt comprising a shaft having a shaft axis oriented perpendicular to a plane of said triple clamp.

9. The handlebar mount assembly of claim 5, wherein said at least one fastener comprises a first bolt and a second bolt, said first bolt positioned at said first location and said second bolt positioned at said second location.

10. The handlebar mount assembly of claim 1, wherein said dampener at said first location is a separate member from said dampener at said second location.

11. A handlebar mount assembly, comprising:
    a triple clamp mountable to an associated vehicle for rotation about a steering axis;
    at least one handlebar clamp assembly comprising a lower handlebar clamp and an upper handlebar clamp connectable to said lower handlebar clamp, said upper handlebar clamp and said lower handlebar clamp cooperating to define an aperture configured to receive a handlebar and defining a handlebar axis;
    wherein said lower handlebar clamp is removeably connectable to said triple clamp and wherein, in response to a twisting force applied to said lower handlebar clamp, said lower handlebar clamp and said triple clamp cooperate to provide a first resistance force at a first location and a second resistance force at a second location spaced from said first location in a direction perpendicular to said handlebar axis, said first and second resistance forces cooperating to resist rotation of said lower handlebar clamp relative to said triple clamp;
    at least one dampener interposed between said lower handlebar clamp and said triple clamp.

12. The handlebar mount assembly of claim 11, additionally comprising at least one fastener connecting said lower handlebar clamp to said triple clamp.

13. The handlebar mount assembly of claim 11, wherein said at least one fastener comprises a bolt, and wherein another dampener is positioned between a head portion of said bolt and a lower surface of said triple clamp.

14. The handlebar mount assembly of claim 11, wherein said at least one dampener is positioned at each of said first location and said second location.

15. The handlebar mount assembly of claim 14, wherein said at least one dampener comprises a first dampener positioned at said first location and a second dampener positioned at said second location.

16. The handlebar mount assembly of claim 11, wherein said at least one dampener abuts said lower handlebar clamp and said triple clamp.

17. The handlebar mount assembly of claim 11, additionally comprising at least one fastener connecting said lower handlebar clamp to said triple clamp.

18. The handlebar mount assembly of claim 17, wherein said at least one fastener comprises a bolt, wherein another dampener is positioned between a head portion of said bolt and a lower surface of said triple clamp.

19. The handlebar mount assembly of claim 17, wherein said at least one fastener comprises a bolt, said bolt extending through said at least one dampener.

20. The handlebar mount assembly of claim 17, wherein said at least one fastener comprises a bolt, said bolt comprising a shaft having a shaft axis oriented perpendicular to a plane of said triple clamp.

21. The handlebar mount assembly of claim 17, wherein said at least one fastener comprises a first bolt and a second bolt, said first bolt positioned at said first location and said second bolt positioned at said second location.

22. The handlebar mount assembly of claim 11, wherein said at least one dampener comprises a first dampener at said first location and a second dampener at said second location.

23. A handlebar mount assembly, comprising:

- a triple clamp mountable to an associated vehicle for rotation about a steering axis;
- at least one handlebar clamp assembly comprising a lower handlebar clamp and an upper handlebar clamp connectable to said lower handlebar clamp, said upper handlebar clamp and said lower handlebar clamp cooperating to at least partially define an aperture configured to receive a handlebar and having a handlebar axis;
- wherein said lower handlebar clamp is removeably connectable to said triple clamp and, in the presence of a twisting force applied to said lower handlebar clamp in a direction generally normal to said handlebar axis, means to resist rotation of said lower handlebar clamp relative to said triple clamp about an axis generally normal to said handlebar axis;
- at least one dampener interposed between said lower handlebar clamp and said triple clamp.

* * * * *